Figure 1:
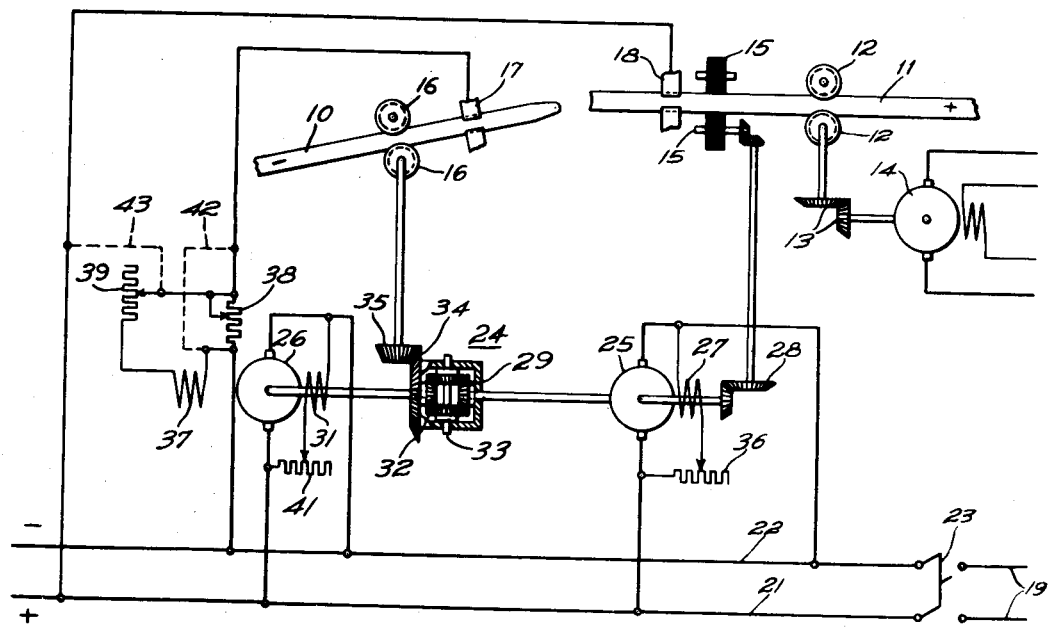

May 17, 1938.     O. G. RUTEMILLER     2,117,911
ELECTRODE FEEDING MECHANISM FOR HIGH INTENSITY ARC SEARCHLIGHTS
Filed June 27, 1934

WITNESSES:

INVENTOR
Oren G. Rutemiller.
ATTORNEY

Patented May 17, 1938

2,117,911

UNITED STATES PATENT OFFICE 2,117,911

ELECTRODE FEEDING MECHANISM FOR HIGH INTENSITY ARC SEARCHLIGHTS

Oren G. Rutemiller, Wilkinsburg, Pa., assignor to Westinghouse Electric & Manufacturing Company, East Pittsburgh, Pa., a corporation of Pennsylvania Application June 27, 1934, Serial No. 732,685

8 Claims. (Cl. 176—73)

My invention relates, generally, to electrode feeding devices or mechanisms for arc lights, and more particularly to a feeding device for electrodes in high-intensity arc searchlights.

The object of my invention, generally stated, is to provide an electrode feeding mechanism for searchlights and similar equipment which shall be simple and efficient in operation and which may be readily manufactured and installed.

A more specific object of my invention is to provide for feeding an electrode in accordance with a predetermined characteristic of the arc.

A further object of my invention is to provide for automatically feeding an arc lamp electrode to maintain a desired arc length in accordance with the arc current or arc voltage.

Another object of my invention is to provide an electrode feeding mechanism for arc lights which shall automatically advance the electrode and retract it to draw the arc and thereafter function automatically to regulate the arc length in accordance with arc current or arc voltage.

A still further object of my invention is to provide a device for automatically feeding one electrode of an arc lamp in accordance with arc current or voltage and for simultaneously rotating the other electrode.

Another object of my invention is to provide a single mechanism or means for automatically feeding the negative electrode and rotating the positive electrode.

Figure 2:
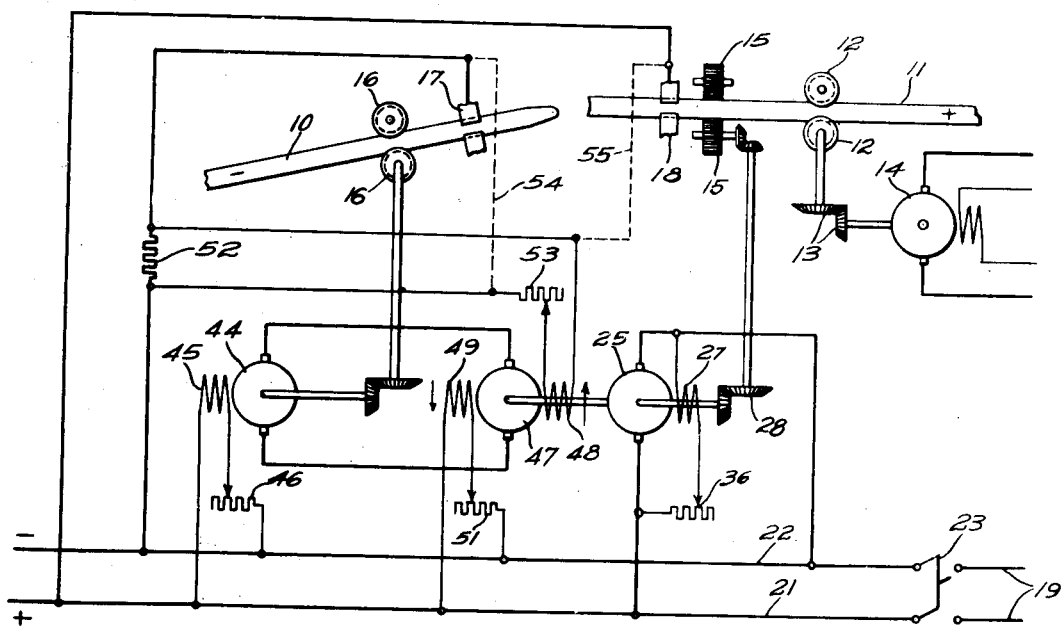

These and other objects of my invention may be more readily understood by referring to the drawing, in which:

Figure 1 is a diagrammatic view of an electrode feeding mechanism or device embodying the principal features of my invention; and Fig. 2 is a modification of the device shown in Fig. 1.

In practicing my invention, I provide for controlling the feeding of the negative electrode in accordance with a predetermined characteristic of the arc such, for example, as arc current or arc voltage by means of differential means either in the form of a mechanical differential or an electrical differential.

In either case, I utilize a motor which operates at a predetermined constant speed and another motor which may be termed the feed motor, the speed and direction of rotation of which is automatically controlled in such manner as to establish the arc by advancing the negative electrode into contact with the positive electrode and then retracting the negative electrode to strike the arc after which the feed motor speed is automatically controlled in accordance with an arc characteristic, such as current or voltage, to control the feeding operation of the negative electrode.

Referring now to Fig. 1 of the drawing, there is illustrated an electrode feeding mechanism in schematic form which may be used for arc lamps, in general, and more particularly for arc searchlights and the like.

In Fig. 1, reference character 10 designates the negative electrode or carbon and reference character 11 the positive carbon of an arc lamp or searchlight. The carbons 10 and 11 may be supported within the lamp or searchlight housing in any suitable manner well known in the art, and since the particular kind of mounting or holders forms no part of the present invention, it has been deemed unnecessary to illustrate it.

The positive carbon 11 may be fed by means of feed rollers 12 connected by means of gears 13 to a motor 14 or any other suitable device which may be controlled in any desired and well known manner to maintain the tip or crater of the positive carbon in a predetermined position with respective to the mirror or reflector. Since the particular manner in which the control of the positive carbon feed is effected forms no part of the present invention, it has not been illustrated in detail.

In accordance with the usual practice, rollers 15 are provided for rotating the positive carbon. As will be readily understood, the feed rollers 12 and the rotating rollers 15 may function separately, as shown, or they may be combined in a single mechanism or a single mechanism may be provided in which the feed rollers 12 are not only driven but are rotated about the electrode in order to rotate it.

The feeding of the negative electrode 10 may be effected by means of rollers 16 in a well known manner.

Current may be conveyed to the electrodes 10 and 11 by means of suitable brush sets 17 and 18 which are usually carried by the electrode holders but are illustrated schematically in this instance in order to simplify the drawing.

Power for operating the arc lamp or searchlight may be obtained from any suitable source illustrated by conductors 19 which may be connected to the lamp circuit represented by conductors 21 and 22 by a switch 23.

In this embodiment of the invention, the feeding of the negative carbon and the rotation of the positive carbon is effected by means of a single or unitary mechanism comprising a mechanical differential 24 and direct-current motors 25 and 26.

The motor 25 is provided with a shunt field winding 27 and has its armature connected to the rollers 15 for the positive carbon through gears 28 and also to one of the sun-gears 29 of the differential 24.

The feed motor 26 is also provided with a shunt field winding 31 and has its armature connected to the other sun-gear element 32 of the differential.

The planetary element 33 of the differential is connected to the feed rollers 16 for the negative carbon through the ring-gear 34 and pinion 35 in a well known manner in order to provide for controlling the speed and direction of rotation of the feed rollers 16 in accordance with the relative speeds of the motors 25 and 26.

In this instance, the motor 25 receives power from conductors 21 and 22, and, therefore, becomes energized when switch 23 is closed. The speed of this motor may be controlled by a field rheostat 36 and when energized and the excitation adjusted this motor runs at a substantially constant speed to rotate the positive carbon 11 and drive one side of the differential 24.

In order to cause the negative carbon to be fed in accordance with a predetermined characteristic of the arc, in this case in accordance with arc current, the feed motor 26 is provided with a second field winding 37 connected across a resistor 38 in the arc circuit. The strength of this field winding may be varied or adjusted by a field rheostat 39 or by varying the value of resistor 38.

As will be readily understood, when the motors 25 and 26 are operating at substantially equal speeds in opposite directions, there will be no movement of the planetary element 33 of the differential, and consequently the negative carbon 10 will be stationary.

In order, however, to advance the negative carbon until it touches the positive carbon, the field excitation of the motor 26 may be adjusted by means of the field rheostat 41 until the speed of this motor exceeds that of motor 25. When the switch 23 is closed, both motors become energized, and since the motor 26 is operated at a high speed, the negative carbon 10 is advanced toward the tip of the positive carbon 11.

As soon as contact between the carbons occurs, a heavy current flows in the electrode circuit, which includes the resistor 38, which energizes the field winding 37 of the motor 26. This field winding is cumulative with respect to the field winding 31 and, consequently, the excitation of the motor 26 may be increased to such an extent as to cause its speed to now be considerably lower than that of the motor 25.

When this condition occurs, the planetary element 33 will reverse, and the negative carbon retracted in order to strike the arc. As soon, however, as the arc is formed, the current flowing through the resistor 38 is reduced and the motor 26 begins to speed up until a point is reached where the negative carbon 10 is automatically regulated so as to maintain a predetermined arc current, and is advanced at such a rate as to compensate for the rate at which it is consumed by the arc.

By means of the rheostats 36, 39 and 41 and the variable connection to the resistor 38, almost any desired operation of the device may be obtained by simply adjusting the resistors until the desired working conditions are obtained.

While I have illustrated in Fig. 1 an arc current responsive system it is apparent that the feed motor 26 may be rendered responsive to some other characteristic of the arc, such, for example, as voltage. If it is desired to utilize arc voltage as the controlling medium, the field winding 37 may be connected across the arc, as shown by the broken lines 42 and 43.

Referring now to Fig. 2, in which the elements similar to those in Fig. 1 are designated by the same reference characters, there is illustrated an electrode feeding device embodying an electrical differential instead of the mechanical differential as in Fig. 1.

In this instance, the negative carbon feed motor 44 is provided with a field winding 45 connected across conductors 21 and 22 through a suitable field rheostat 46. The speed and direction of rotation of the feed motor 44 is controlled by means of a generator 47, which is driven at a substantially constant speed by the motor 25, which also rotates the positive electrode as in the system of Fig. 1. The direction and value of the generator voltage is in this instance determined by the energization of two field windings 48 and 49 which are differentially related, field winding 49 being connected across conductors 21 and 22 through a field rheostat 51, while field winding 48 is connected across a resistor 52 in the arc circuit through a field rheostat 53.

In this instance, when the switch 23 is closed, the arc circuit is open, and only the field winding 49 of the generator 47 is energized. This causes the generator to develop a voltage in one direction which causes the feed motor 44 to advance the negative carbon toward the positive carbon. As soon, however, as contact between the carbons is obtained, a heavy current flows through the arc circuit and resistor 52 which energizes the field winding 48 to such an extent as to effect a reversal of the generator voltage. This causes the feed motor 44 to quickly reverse to strike the arc.

The excitation of the generator 47 and the feed motor 44 is so adjusted as to cause the arc current to be maintained at the desired value, the adjustment being such that the negative electrode 10 is only fed forwardly sufficiently to compensate for the amount burned away.

As in the case of Fig. 1, the electrical differential scheme may also be operated in accordance with arc voltage by connecting the field winding 48 of the generator directly across the arc instead of across resistor 52 by means of the connections 54 and 55 shown by broken lines.

In view of the foregoing description, it is apparent that I have provided a very simple and effective device for controlling both the feeding of the negative carbon of the searchlight and the rotation of the positive carbon. By the use of the invention, all of the complicated mechanisms heretofore used are eliminated, and a much more positive and efficiently operating feed mechanism obtained.

It may be stated in conclusion that, while the illustrated examples constitute practical embodiments of my invention, I do not wish to limit myself strictly to the exact details herein illustrated, since other modifications of the same may be made without departing from the spirit of the invention as defined in the appended claims.

I claim as my invention:

1. In combination, a pair of electrodes disposed in arcing relation, a circuit for supplying current to the electrodes, means including a first motor for rotating one of said electrodes at a substantially constant speed, means for feeding the other electrode comprising a second motor, said first motor, and a differential means responsive to the strength of current flowing through the electrodes cooperating with said motors for varying the rate of feed of said other electrode in accordance with variations in said current strength.

2. In combination, a pair of electrodes disposed in arcing relation, a circuit for supplying current to the electrodes, means including a motor for rotating one of said electrodes at a substantially constant speed, a second motor having a separately-excited field winding of substantially constant strength and a second field winding connected to be energized in accordance with the current flowing in the supply circuit, a differential device interposed between the motors, and means actuated by the differential device for feeding the other electrode at speeds proportional to the current in the supply circuit.

3. In combination, a pair of electrodes disposed in arcing relation, a circuit for supplying current to said electrodes, means including a motor for rotating one electrode at a substantially constant speed, means including a second motor for feeding the other electrode, a generator having differentially-related field windings for supplying power to the second motor, said generator being driven by the first motor, one of the generator field windings having a substantially constant energization and the other being energized in accordance with a predetermined electrical characteristic of the arc.

4. In combination, a pair of electrodes disposed in arcing relation, a circuit for supplying current to said electrodes, means operable to rotate one electrode, means operable to feed the other electrode, a motor for driving the rotating means at a substantially constant speed, a second motor for driving the feeding means, a generator disposed to be driven by the first motor for supplying variable voltage power to the second motor, said generator having differentially-related field windings, one of said field windings having a substantially constant energization and effective to cause the generator to develop a voltage in one direction and the other of said generator field windings being energized in accordance with the arc current, whereby the second motor is caused to feed its associated electrode toward the other electrode to form the arc whereupon the other generator field winding becomes energized to cause the generator to develop a voltage in such direction as to cause the second motor to retract the electrode to strike the arc and to thereafter control the arc length in accordance with the arc current.

5. In combination, a positive electrode, a negative electrode, a circuit for supplying current to said electrodes to produce an arc between the tips thereof, means including a first motor for rotating the positive electrode, means for feeding the negative electrode, a differential device having its planetary element connected to the negative electrode feeding means and one of its sun gears connected to the first motor, and a second motor for driving the other sun gear of the differential device, said second motor having differentially-related field windings, one of the said field windings having substantially constant separate energization and the other being excited in accordance with the arc voltage.

6. In combination, positive and negative electrodes disposed in arcing relation, a direct current energizing circuit for the electrode, means including a motor for rotating the positive electrode at a substantially constant speed, a second motor provided with differentially-related field windings, and differential means interposed between said motors and disposed to forwardly feed and retract the negative electrode dependent upon the relative speeds of the motors, one of said field windings on the second motor being energized in accordance with the arc current and the other field winding being energized at a substantially constant voltage, whereby upon energization of the electrode circuit the negative electrode is fed forwardly to engage the positive electrode, retracted to strike the arc and thereafter fed in accordance with the arc current.

7. In combination, a pair of electrodes disposed in arcing relation, a source of power for supplying current to the electrodes to produce an arc, a first motor connected to the power source to operate at a substantially constant speed, a second motor connected to the power source disposed to operate at a variable speed in accordance with a single electrical characteristic of the arc, means whereby said first motor rotates one of the electrodes, and a differential gear mechanism actuated by both of the motors for feeding the other electrode to automatically strike and maintain an arc.

8. In an arc light, in combination, positive and negative electrodes, a source of power for said electrodes, means for feeding the positive electrode, electro-responsive means for rotating the positive electrode at a substantially constant speed, a differential gear mechanism operable to control the feeding of the negative electrode, said electro-responsive means being disposed to drive one element of the differential gear mechanism at a substantially constant speed, and a variable speed motor having its excitation controlled in accordance with a single variable electrical characteristic of the arc for driving another element of the differential gear mechanism.

OREN G. RUTEMILLER.